(12) United States Patent
Blaess et al.

(10) Patent No.: US 10,816,031 B2
(45) Date of Patent: Oct. 27, 2020

(54) SWIVEL HANGER

(71) Applicant: Black & Decker Inc., New Britain, CT (US)

(72) Inventors: Donald K. Blaess, Cresco, IA (US); Adam P. Bauer, Decorah, IA (US); Mark Theismann, Decorah, IA (US)

(73) Assignee: BLACK & DECKER INC., New Britain, CT (US)

( * ) Notice: Subject to any disclaimer, the term of this patent is extended or adjusted under 35 U.S.C. 154(b) by 62 days.

(21) Appl. No.: 16/001,567

(22) Filed: Jun. 6, 2018

(65) Prior Publication Data

US 2018/0283443 A1    Oct. 4, 2018

Related U.S. Application Data

(62) Division of application No. 14/561,590, filed on Dec. 5, 2014, now abandoned.

(51) Int. Cl.
| | | |
|---|---|---|
| *F16M 13/00* | (2006.01) | |
| *F16C 11/06* | (2006.01) | |
| *F16B 25/10* | (2006.01) | |
| *F16B 35/06* | (2006.01) | |

(Continued)

(52) U.S. Cl.
CPC .......... *F16C 11/06* (2013.01); *F16B 25/0031* (2013.01); *F16B 25/103* (2013.01); *F16B 35/06* (2013.01); *F16B 45/00* (2013.01); *F16C 11/0604* (2013.01); *F16C 11/0623* (2013.01)

(58) Field of Classification Search
CPC ...... A47F 5/0006; A47F 5/0892; F16C 11/06; F16C 11/069; F16C 11/0695; F16C 11/0604; F16B 25/0031; F16B 25/103; F16B 35/06; F16B 45/00; F16B 35/065;
(Continued)

(56) References Cited

U.S. PATENT DOCUMENTS

| | | | | |
|---|---|---|---|---|
| 2,765,134 A | * | 10/1956 | Hill | F16B 13/0808 248/489 |
| 3,435,729 A | * | 4/1969 | Toth | A63B 37/0002 144/2.1 |

(Continued)

FOREIGN PATENT DOCUMENTS

DE          20005059 U      5/2000

OTHER PUBLICATIONS

European Office Action dated Jul. 4, 2019.

*Primary Examiner* — Michael P Ferguson
(74) *Attorney, Agent, or Firm* — Kofi A. Schulterbrandt; Michael P. Leary

(57) ABSTRACT

A swivel hanger system includes an anchor member with an anchor head disposed at an end of the anchor member and an elongated body, where at least a portion of the elongated body is configured to be inserted into a support member when the system is connected with the support member. The system also includes a swivel member with an open end extending to a hollow interior of the swivel member, where the open end is configured to rotatably couple with the anchor head such that the anchor head is located within the hollow interior and the elongated body extends through the swivel member open end. The system further includes a stop structure to limit an insertion distance at which the anchor member is inserted into the support member.

11 Claims, 13 Drawing Sheets

(51) Int. Cl.
*F16B 25/00* (2006.01)
*F16B 45/00* (2006.01)

(58) Field of Classification Search
CPC .......... F16M 13/027; Y10T 403/32196; Y10T 403/32204; Y10T 403/32631
USPC ................ 403/122, 127; 248/317, 323, 324; 606/266
See application file for complete search history.

(56) References Cited

U.S. PATENT DOCUMENTS

| | | | | |
|---|---|---|---|---|
| 5,101,698 A * | 4/1992 | Paradiso | ................. | B25B 23/14 81/180.1 |
| 5,207,678 A * | 5/1993 | Harms | ............... | A61B 17/7008 606/267 |
| 5,316,419 A * | 5/1994 | Bohnet | ............... | B23B 51/0027 279/6 |
| 5,624,198 A * | 4/1997 | Fuchs | .................... | F16C 11/06 248/278.1 |
| 6,019,555 A * | 2/2000 | Sadoski | ............... | B23B 51/101 408/199 |
| 6,280,442 B1 * | 8/2001 | Barker | ............... | A61B 17/7037 606/256 |
| 6,379,357 B1 * | 4/2002 | Bernstein | ........... | A61B 17/7007 606/246 |
| 6,443,680 B1 * | 9/2002 | Bodin | ................ | F16B 23/0038 411/375 |
| 6,520,963 B1 * | 2/2003 | McKinley | .......... | A61B 17/7032 606/266 |
| 6,722,826 B2 * | 4/2004 | Cavanaugh | ............... | B23C 5/14 408/708 |
| 6,848,346 B1 * | 2/2005 | Panasik | .................. | B25B 15/00 81/436 |
| 6,935,821 B2 * | 8/2005 | Bodin | ................ | B25B 27/0007 411/29 |
| 7,467,477 B1 * | 12/2008 | Flemming | .............. | B62M 9/125 33/533 |
| 7,581,909 B2 * | 9/2009 | Szoke | ........................ | B21F 9/00 411/396 |
| 7,722,654 B2 * | 5/2010 | Taylor | ................ | A61B 17/7007 606/287 |
| 7,780,134 B2 * | 8/2010 | Panasik | ................. | F16B 5/0275 248/324 |
| 8,002,806 B2 * | 8/2011 | Justis | ................. | A61B 17/7038 606/246 |
| 8,100,946 B2 * | 1/2012 | Strausbaugh | ...... | A61B 17/7032 606/266 |
| 8,251,604 B2 * | 8/2012 | Rolle | ........................ | B60B 1/00 301/58 |
| 8,636,778 B2 * | 1/2014 | Gephart | ............. | A61B 17/7037 606/267 |
| 8,740,946 B2 * | 6/2014 | Peterson | ............ | A61B 17/7032 606/264 |
| 8,808,330 B2 * | 8/2014 | Biedermann | ........ | A61B 17/701 606/264 |
| 9,198,769 B2 * | 12/2015 | Perrow | ............. | A61B 17/8042 |
| 9,358,050 B2 * | 6/2016 | Black | ................. | A61B 17/8038 |
| 9,367,317 B2 * | 6/2016 | Combs | ................. | G06F 9/30145 |
| 9,498,254 B2 * | 11/2016 | Spratt | ................ | A61B 17/7032 |
| 10,132,347 B2 * | 11/2018 | Armiento | ........... | F16C 11/0623 |
| 2008/0213034 A1 | 9/2008 | Wood | | |

* cited by examiner

SWIVEL HANGER

CROSS-REFERENCE TO RELATED APPLICATIONS

The present application is a divisional application of pending U.S. patent application Ser. No. 14/561,590 filed on Dec. 5, 2014 and entitled "SWIVEL HANGER", the contents of which is incorporated herein by reference in its entirety.

FIELD

The present invention is directed toward a swivel hanger for hanging items from support surfaces.

BACKGROUND

Fastening hardware is used to hang objects (for example, wall art, shelving structure, etc.) from support surfaces such as walls and ceilings of rooms. Fastening hardware that includes a swivel component is particularly useful, for example, to allow an object to be movably suspended from a support surface. There are many different types of swivel hangers, some including a number of components to facilitate a swivel connection between anchoring structure and an item to be supported by the swivel hanger. A swivel hanger having few components and that is easy to install would be useful for hanging household objects.

SUMMARY

In an example embodiment, a swivel hanger system comprises an anchor member comprising a first end and a second end, an anchor head disposed at the second end of the anchor member and an elongated body disposed between the first and second ends of the anchor member, where the first end and at least a portion of the elongated body are configured to be inserted into a support member when the system is connected with the support member. The system also comprises a swivel member including a rounded first end and a second end, each of the first and second ends of the swivel member including an opening extending to a hollow interior of the swivel member, and the rounded first end being configured to rotatably couple with the anchor head such that the anchor head is located within the hollow interior and the elongated body extends through the opening at the first end of the swivel member. The system further comprises a stop structure defined on at least one of the anchor member and the swivel member, where the stop structure limits an insertion distance at which the anchor member is inserted into the support member so as to maintain a selected distance between the rounded first end of the swivel member and a surface of the support member after insertion.

BRIEF DESCRIPTION OF THE DRAWINGS

Like reference numerals have been used to identify like elements throughout this disclosure.

DETAILED DESCRIPTION

Figure 1:
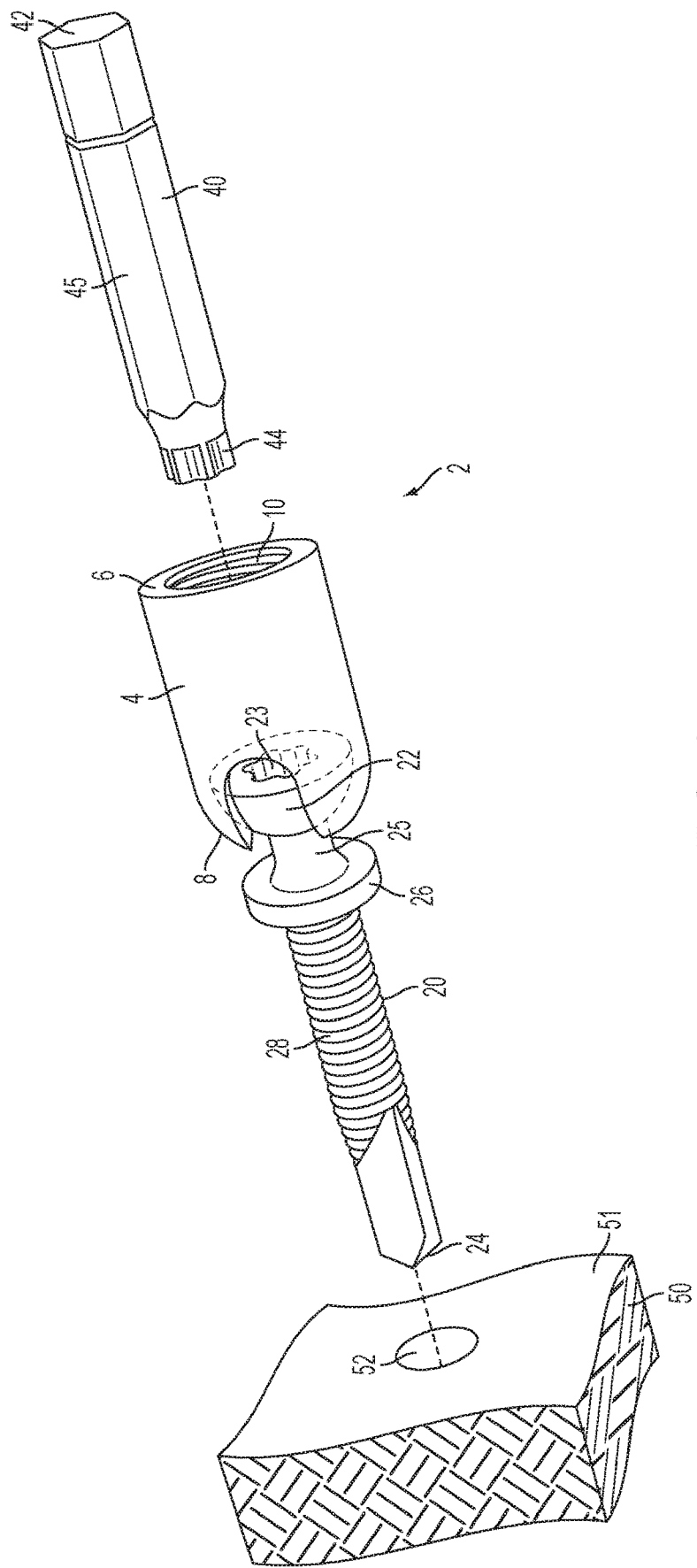
FIG. 1 is a view in perspective and partial cross section of a swivel hanger system being installed with a support surface in accordance with an example embodiment of the present invention.
Figure 2:
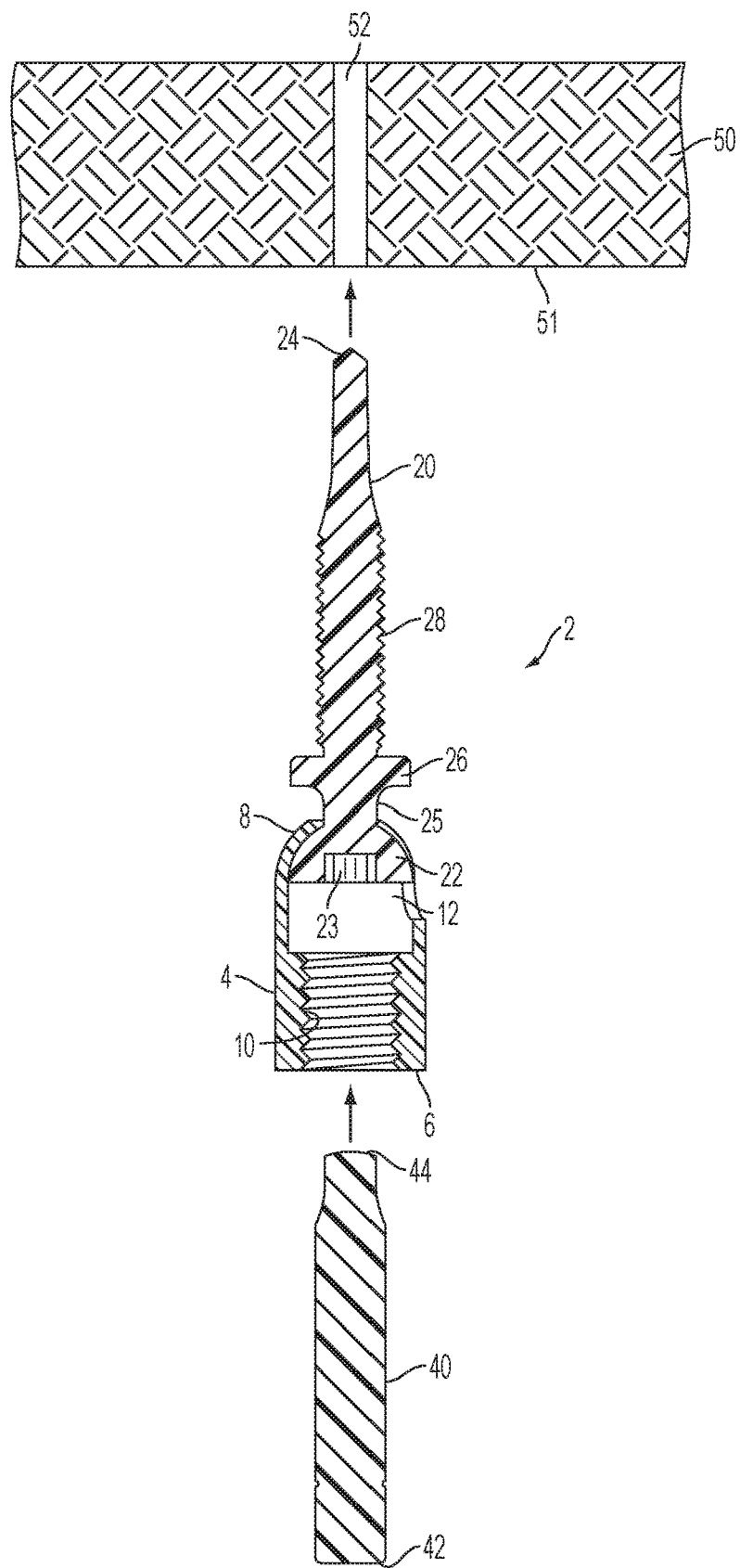
FIG. 2 is a separated cross-sectional view of the swivel hanger system of FIG. 1 being installed with the support surface.

An example embodiment of a swivel hanger system in accordance with the present invention is depicted in FIGS. 1-6. Referring to FIGS. 1 and 2, a swivel hanger system includes a swivel member 4 and an anchor member 20, where the swivel member 4 is suitably dimensioned and configured to rotatably couple with the anchor member 20 during system use. As described herein, an anchoring tool 40, which may or may not be part of the system 2, is utilized to secure the anchor member 20 with swivel member 4 to a suitable support member 50. The swivel member 4, anchor member 20 and tool 40 can be constructed of any suitable and sufficiently rigid materials to facilitate installation and use of the anchor system, where some non-limiting examples of suitable materials include metal materials (for example, steels or steel alloys, such as stainless steel, carbon steel, etc.) and rigid plastic materials (for example, polyester resins).

The anchor member 20 of the system 2 includes a threaded elongated main body portion 28 that terminates at a pointed or lower first end 24 to facilitate engagement and anchoring of the main body portion 28 within an opening or bore 52 formed in a support member 50 by rotation or screwing of the main body portion 28 into the bore 52. The anchor member 20 can further be configured to form the bore 52 within support member 50 as the anchor member 20 is moved toward and into the support member 50 during installation. In particular, the anchor member 20 is configured such that the pointed first end 24 pierces a support member 50 to create a pilot hole in the surface, where the threaded main body portion 28 is then rotated while force is applied to the anchor member 20 to force the anchor member into the support member 50, thus forming the bore 52 (where the bore becomes threaded as the anchor member is rotated into the support member 50). Alternatively, the bore 52 may be initially formed by a pilot hole (a hole formed in the support member 50 having a smaller diameter or cross-sectional dimension in relation to the diameter or cross-sectional dimension of the main body portion 28).

It is further noted that the body portion of the anchor member 20 can also be configured to secure to the support member 50 in any other suitable manner instead of utilizing a threaded surface for a screw-like anchoring engagement. For example, the body portion of the anchor member can instead have a smooth outer periphery that terminates at a point (for example, configured like a nail) to facilitate pounding of the anchor member (e.g., utilizing a hammer or other tool) into the bore 52. Other alternative configurations of the body portion of the anchor member can also be implemented to suitably secure the body portion within the bore 52 of the support member 50.

The main body portion 28 also includes an upper or second end 26 that opposes the lower or first end 24. A flange is defined at the second end 26 (also referred to herein as the flange end 26) that has a cross-sectional dimension that is greater than the cross-sectional dimension of the rest of the main body portion 28, such that the flange end abuts a surface 51 of the support member 50 when the rest of the threaded main body portion 28 is secured within the bore 52. An anchor head 22 extends from the flange end 26. A column or pillar member 25 extends between the anchor head 22 from the flange end 26. The pillar member 25 can have a cross-sectional dimension that is less than the cross-sectional dimension of each of the anchor head 22 and flange end 26 of the main body portion 28.

The anchor head 22 includes a flat upper surface including a patterned or shaped depression or indentation 23. For example, the patterned indentation 23 can be in the shape of a six pointed star as shown in the figures. However, the indentation can also have any other suitable pattern (for example, a linear or slotted indentation, a cross or X-shaped/Phillips type indentation, etc.). The underside of the anchor head 22 extending from its flat upper surface to the pillar member 25 has a curved configuration that is generally hemispherical in shape (i.e., has the general shape of a cut-in-half sphere).

The swivel member 4 is hollow and includes a rounded lower or first end 8 that has a contour generally conforming to the hemispherical underside of the anchor head 22 and further includes an opening that extends to the hollow interior of the swivel member. The swivel member 4 further includes a flat upper or second end 6 that includes an opening to the hollow interior of the swivel member. The lower or first end 8 of the swivel member 4 further includes a rotation slot or cut-out section 12 that extends from the opening at the first end 8 a selected distance along the lengthwise dimension of the swivel member 4. The cut-out section 12 and opening at the first end 8 are both suitably dimensioned to receive the anchor head 22 of the anchor member 20 within the hollow interior of the swivel member 4 such that the swivel member is movably secured to the anchor member, where the swivel member 4 is free to pivot or swivel about the anchor head 22 (i.e., swivel movement refers to vertical and/or horizontal rotational movements) in various directions and at various angles of in relation to the anchor member 20. The relationship between anchor head 22 and first end 8 of swivel member 4 can also be described as a ball and socket respectively, where first end 8 forms an interior socket. Receipt of tool 40 into anchor head 22 within the hollow interior at the first end 8 of the swivel member 4 can be made possible, for example, by first aligning the swivel member 4 such that its lengthwise dimension is transverse the lengthwise dimension of the anchor member 20 and then fitting the anchor head 22 through the cut-out section 12 such that the anchor head is located within the hollow interior of the swivel member 4 at the first end 8. When the anchor head 22 is fit inside the swivel member 4 in this manner (and as depicted in the figures), the hemispherical contour of the anchor head 22 engages with the interior rounded first end 8 of the swivel member 4 in a manner similar to a ball-and-socket type joint. This engagement facilitates pivotal or swiveling movement of the swivel member 4 in a variety of positions in relation to the anchor member 20 while maintaining the coupling of the swivel and anchor members via the anchor head being trapped within the swivel member hollow interior.

The swivel member 4 further includes a threaded interior surface 10 within its hollow interior at a location proximate the upper or second end 6. The threaded interior surface 10 provides a connection for an object to be hung from the swivel member (for example, via connection with a threaded connector having a diameter that matches the inner diameter dimension of the threaded interior surface) when the anchor member 20 is secured with a support member 50. Threaded interior surface 10 may be stepped threaded so that surface 10 is replaced by multiple threads surfaces of different diameters with threads increasing in size from end 8 to end 6 enabling surface 10 to receive multiple size threaded connectors (e.g., threaded rods).

The hollow interior of the swivel member 4 is further suitably dimensioned to facilitate insertion of at least a portion of the tool 40 lengthwise into the hollow interior via the opening at the upper of second end 6 such that tool 40 can engage with the anchor head 22 during installation as described herein. The tool 40 has an elongated configuration including a lower or first end 44 and an upper or second end 42 that opposes the first end 44. The tool 40 further has a main body portion 45 with a multi-faceted or shaped exterior periphery having a polygonal cross-section (for example, a hexagonal cross-section as shown in the figures). This facilitates a releasable (for example, friction-fit) connection of the tool 40 at its upper or second end 42 with a grip or handle member, such as a screw driver handle or powered tool such as a drill (not shown), that locks the tool in relation to the handle member or chuck such that rotational movements of the handle member are translated to the tool. However, it is noted that the external periphery of the tool can be of any suitable shape (for example, circular or rounded, polygonal, irregular, etc.) that facilitates a releasable coupling or complementary shaped connection between the tool and handle member or powered tool. The lower or first end 44 of the tool 40 can have a reduced cross-sectional dimension in relation to the tool main body portion 45 and further has a cross-sectional geometric shape that corresponds with the indentation 23 of the anchor head 22. For example, the first end 44 can have a six pointed star-shaped configuration (as shown in the figures) to correspond with the six pointed star-shape configuration of the anchor head indentation 23. Alternatively, the first end 44 can have any other suitable shape (e.g., the shape of a conventional screwdriver head, such as slotted, Phillips or cross-shaped, etc.) that corresponds with the shape of the anchor head indentation.

Figure 3:
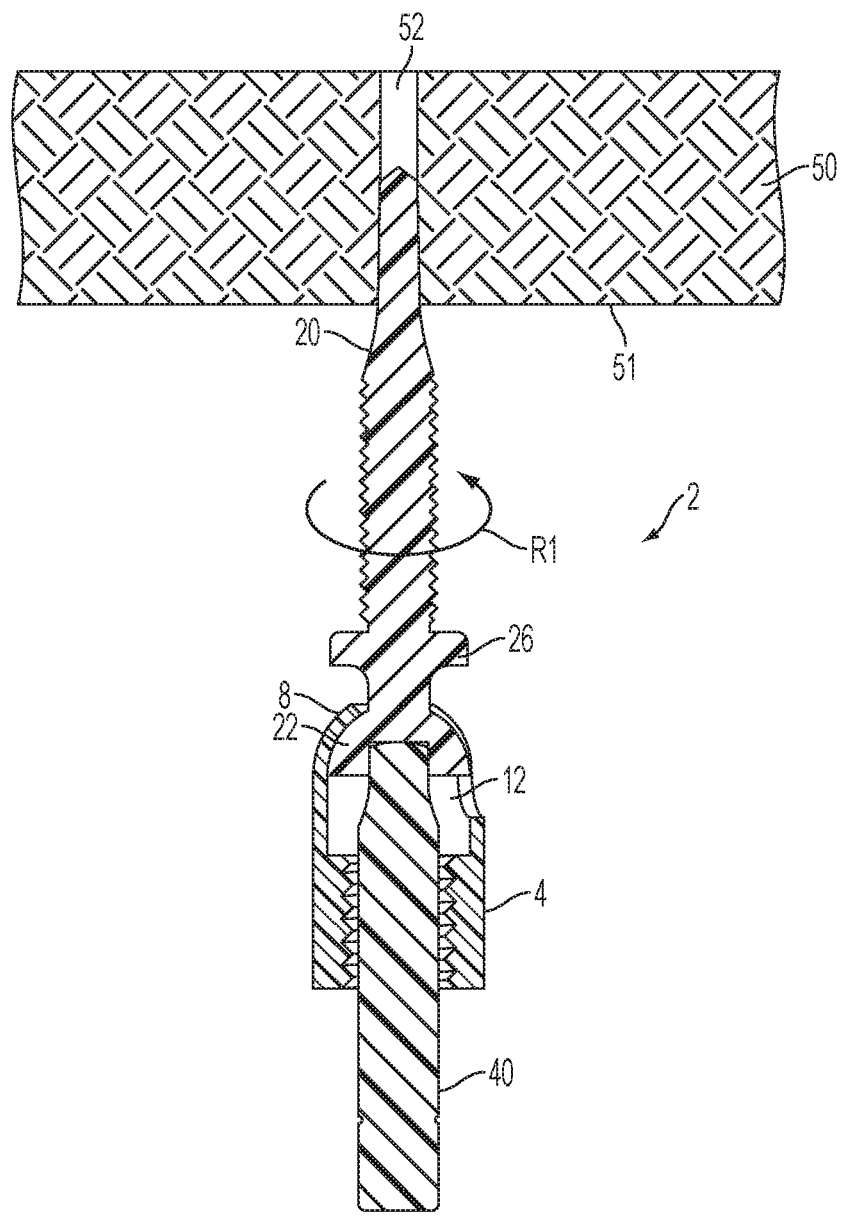
FIG. 3 is an engaged cross-sectional view of the swivel hanger system of FIG. 1 being installed with the support surface.
Figure 4:
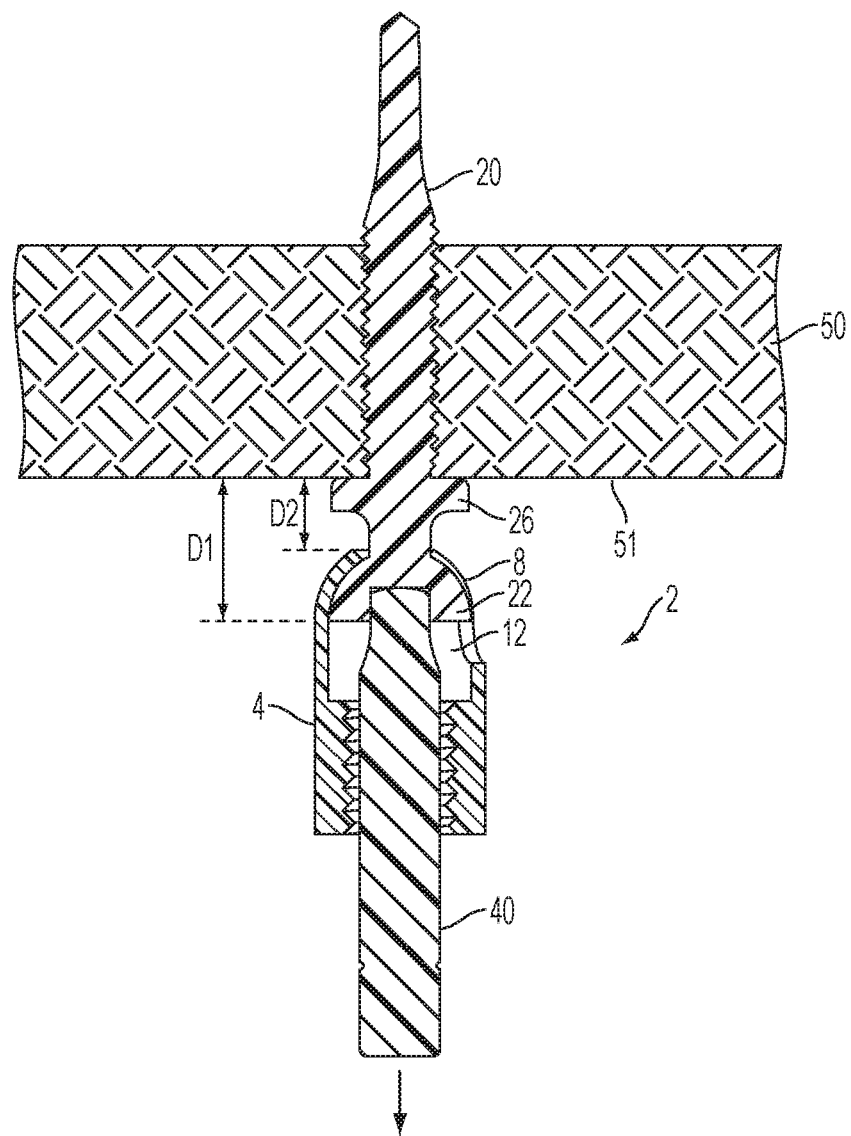
FIG. 4 is a cross-sectional view of the swivel hanger system of FIG. 1 connected with the support surface with the bit engaging the fastener.

Installation of the swivel hanger system to secure the anchor and swivel members to a support member is now described with reference to FIGS. 1-4. Attachment of the swivel member 4 with the anchor member 20 to facilitate swivel movements of the swivel member about the anchor head 22 has been described herein. In addition, the tool 40 can be inserted at its second end 42 into a screw driver handle or other tool driving device (for example, in the bit holder of an electronic power drill). Referring to FIGS. 1 and 2, the tool 40 is inserted into the swivel member 4, via the opening at the swivel member upper or second end 6, when the swivel member 4 is aligned generally in the same or similar lengthwise direction as the anchor member 20. The lower or first end 44 of the tool is engaged with the receptacle or indentation 23 at the anchor head 22. Referring to FIG. 3, the lower or first end 24 of the anchor member 20 abuts against a surface 51 of the support member 50, where the support member can be, for example, a side wall or top/ceiling wall of a room or other structure such as a steel beam. The tool 40 is rotated while force is applied to the anchor member 20 via the tool 40. This causes rotation of the anchor member 20 (for example, in rotational direction R1) and movement of the anchor member into the bore 52. Referring to FIG. 4, the anchor member 20 is prevented from further movement into the bore 52 when the flange end 26 of the main body portion 28 abuts the surface 51 of support member 50.

Figure 5:
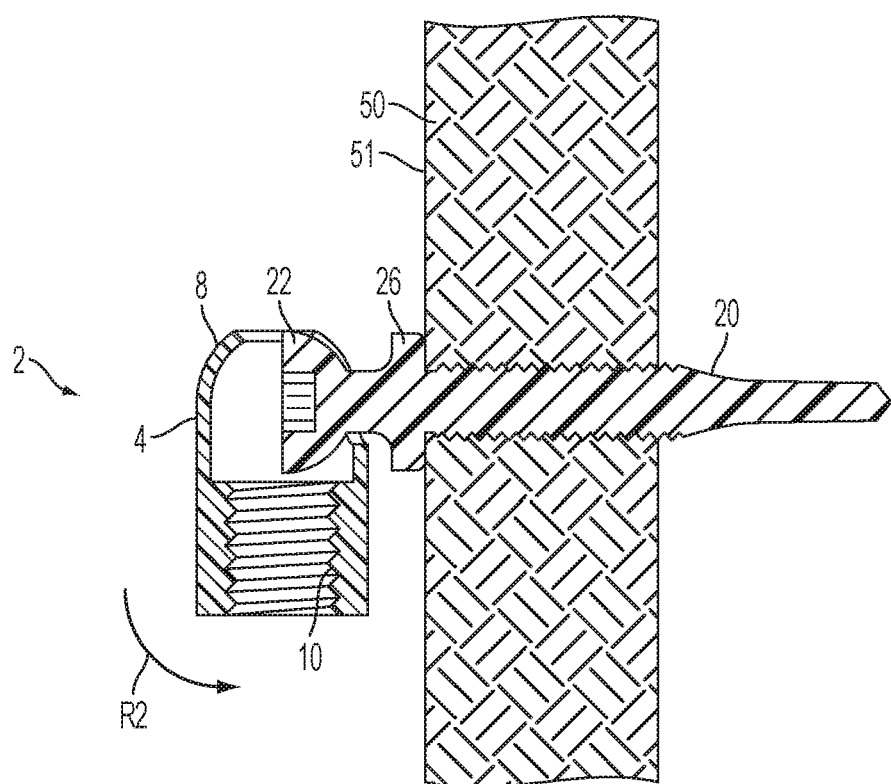
FIG. 5 is a cross-sectional view of the swivel hanger system of FIG. 1 connected with the support surface and hanging at a 90° angle in relation to the support surface.
Figure 6:
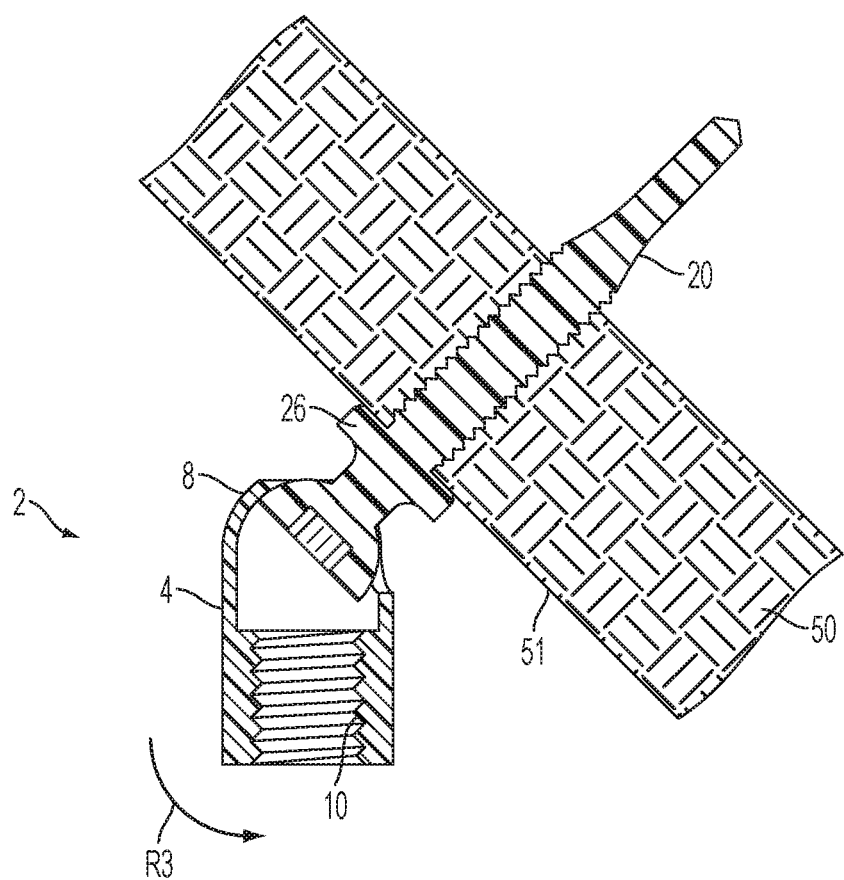
FIG. 6 is a cross-sectional view of the swivel hanger system of FIG. 1 connected with the support surface and hanging at a 45° angle in relation to the support surface.

When the anchor member 20 is sufficiently secured within the bore 52 (for example, when the flange end 26 abuts support surface 51), installation of the swivel hanger system is complete, and the tool 40 can be removed from the swivel member hollow interior. As can be seen in FIGS. 4-6, the swivel member 4 is free to rotate or swivel in various directions in relation to the anchor member 20 and support member 50 when the anchor member is secured with the support member, and this is possible regardless of how the support member is aligned in relation to a ground surface (for example, regardless of whether the support surface is a ceiling wall that is generally parallel with a ground surface as shown in FIG. 4, or a sidewall as shown in FIGS. 5 and 6 that is generally perpendicular or at some transverse alignment in relation to a ground surface). Examples showing how the swivel member 4 can achieve swivel movements in relation to the anchor member 20 are shown in FIG. 5 (see rotational arrow R2) and FIG. 6 (see rotational arrow R3).

As further shown in FIGS. 4-6, complete installation of the swivel hanger system (where the flange end 26 of the anchor member main body portion 28 abuts the surface 51 of the support member 50) allows for free swivel movements of the swivel member 4 in relation to the anchor member 20 and support member 50 due to a slight gap or distance that separates the curved first end 8 of the swivel member 4 (which defines a portion of the ball of the ball-and-socket type swivel joint of the system 2) from the support member surface 51. This is due to the structural features of the system 2, namely the separation distance between the flange end 26 and the anchor head 22 of the anchor member 20. This configuration provides a distance D1 (defined as the distance between the flat upper surface of the anchor head 22 including the indentation 23 and the support surface 51) that is sufficiently greater than a maximum distance D2 (defined as the distance between the rounded first end 8 of the swivel member 4 and the support surface 51 when the swivel member 4 is generally aligned in the same lengthwise direction as the anchor member 20). Since the anchor head 22 cannot be forced closer to the support surface 51 (due to the abutment between the flange end 26 and the support surface 51), this provides a maximum insertion distance at which the anchor member 20 can be inserted into the support member 50 and also ensures a sufficient spacing (distance D2) is maintained that prevents pinching or restricted swivel movement of the swivel member 4 by either or both the anchor member 20 and the support surface 51. Generally stated, the flange end 26 of the anchor member 20 provides a stop to prevent further insertion of the anchor member 20 into the support member bore 52 during installation, thus ensuring the sufficient spacing (distance D2) is always maintained.

An object can be supported by the swing hanger system 2 by connecting the object to the swivel member 4, such that the object is suspended in the same general orientation from the support member 50 as the swivel member 4. For example, an object (such as a potted plant, a decorative art structure, a shelving structure, or any other selected device or component) can include a threaded connector that secures (via threaded engagement) within the threaded interior surface 10 of the swivel member 4 to facilitate a suspended connection between the object and the support surface 50 via the swivel hanger system 2.

An alternative embodiment of a swivel hanger system 102 in accordance with the present invention is depicted in FIGS. 7-12. In this system 102, the tool 140, swivel member 104 and anchor member 120 are similar to those components described for the system 2 of FIGS. 1-6, with the exception that the anchor member 120 does not include a flange (which serves as a stop for insertion of the anchor member into the bore of a support member) at an end of the threaded main body portion 128. Instead, a flange 146 is provided on the tool 140, and (as described herein) this flange provides a stop to prevent insertion of the anchor member 120 beyond a certain distance within the support member 50.

Figure 7:
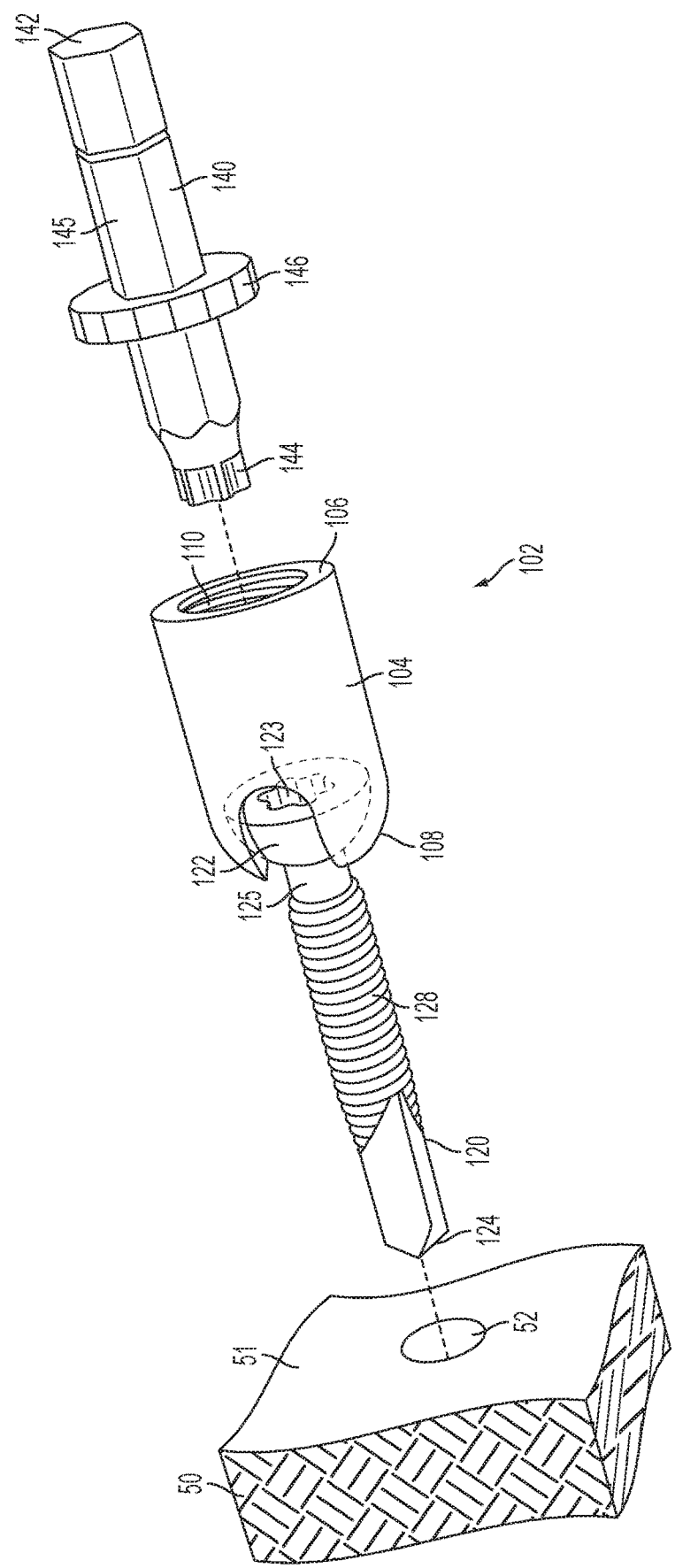
FIG. 7 is a view in perspective and partial cross section of a swivel hanger system being installed within a support surface in accordance with another example embodiment of the present invention.

Referring to FIG. 7, swivel member 104 of system 102 has a substantially similar configuration as swivel member 4 of system 2, including a flat, upper or second end 106 with an opening to a hollow interior and a rounded, lower or first end 108 also having an opening to the hollow interior and a slot or cut-out section 112 at the first end 108. Anchor member 120 of system 102 also has a similar configuration as anchor member 20 of system 2, including a threaded main body portion 128 that extends between a pillar member 125 and a pointed first end 124. The anchor member 120 differs from anchor member 20 of system 2 in that anchor member 120 does not include any flange end for the main body portion 128. Instead, the upper or second end of the main body portion 128 (i.e., the end that opposes first end 124) extends to the pillar 125, where the pillar 125 connects the upper/second end of the main body portion 128 and the anchor head 122. The anchor head 122 is substantially similar to the anchor head 22 of system 2, including a flat upper side with a patterned depression or indentation 123 (for example, in the shape of a six pointed star) and a hemispherical shaped underside that corresponds with the rounded first end 108 of the swivel member 104 (so as to form a ball-and-socket type joint when these components are coupled together as shown in the figures).

The tool 140 of system 102 is similar to tool 40 of system 2, including a lower or first end 144, an upper or second end 142, and a main body portion 145 having a multi-faceted exterior periphery, where the first end 144 has a reduced cross-sectional dimension in relation to the tool main body portion 145 and further has a cross-sectional geometric shape that corresponds with the indentation 123 of the anchor head 122 (e.g., a six pointed star-shaped configuration). Tool 140 further includes a flange 146 that extends transversely from the main body portion 145 at a selected location from each of the ends 142, 144. The size of the flange 146 is dimensioned such that its diameter or greatest width is larger than the opening at the upper or second end 106 of the swivel member 104. Thus, when a portion of the tool 140 including the first end 144 is inserted through the opening at the second end 106 and into the hollow interior of the swivel member 104, the tool 140 is prevented from being inserted further than the length of the tool from its first end 144 to the flange 146. This is because the flange 146 abuts (and thus provides a stop at) the swivel member second end 106 during insertion of the tool 140 within the swivel member 104. Since the swivel member 104 can move rotationally (i.e., in horizontal and/or vertical rotations, also referred to as swivel movements) as well as lengthwise or longitudinally to a certain extent along the main body portion 128 of the anchor member 120, the first end 144 of the tool 140 can sufficiently engage with the indentation 123 of the anchor head 122 within the swivel member 104 during installation (in which a portion of the anchor member 120 is inserted within the bore 52 of the support surface 50).

Figure 8:
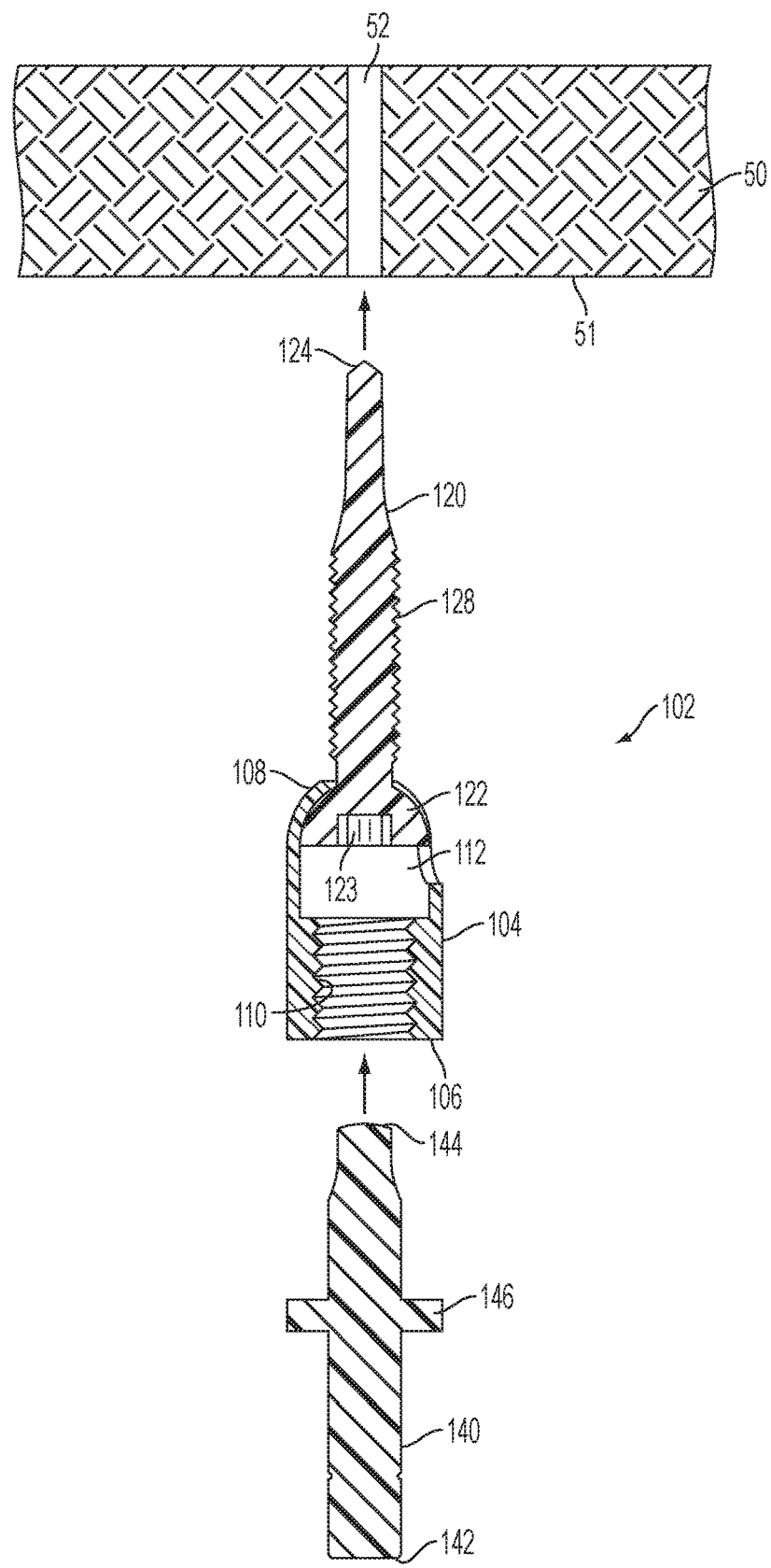
FIG. 8 is a separated cross-sectional view of the swivel hanger system of FIG. 7 being installed within the support surface.
Figure 9:
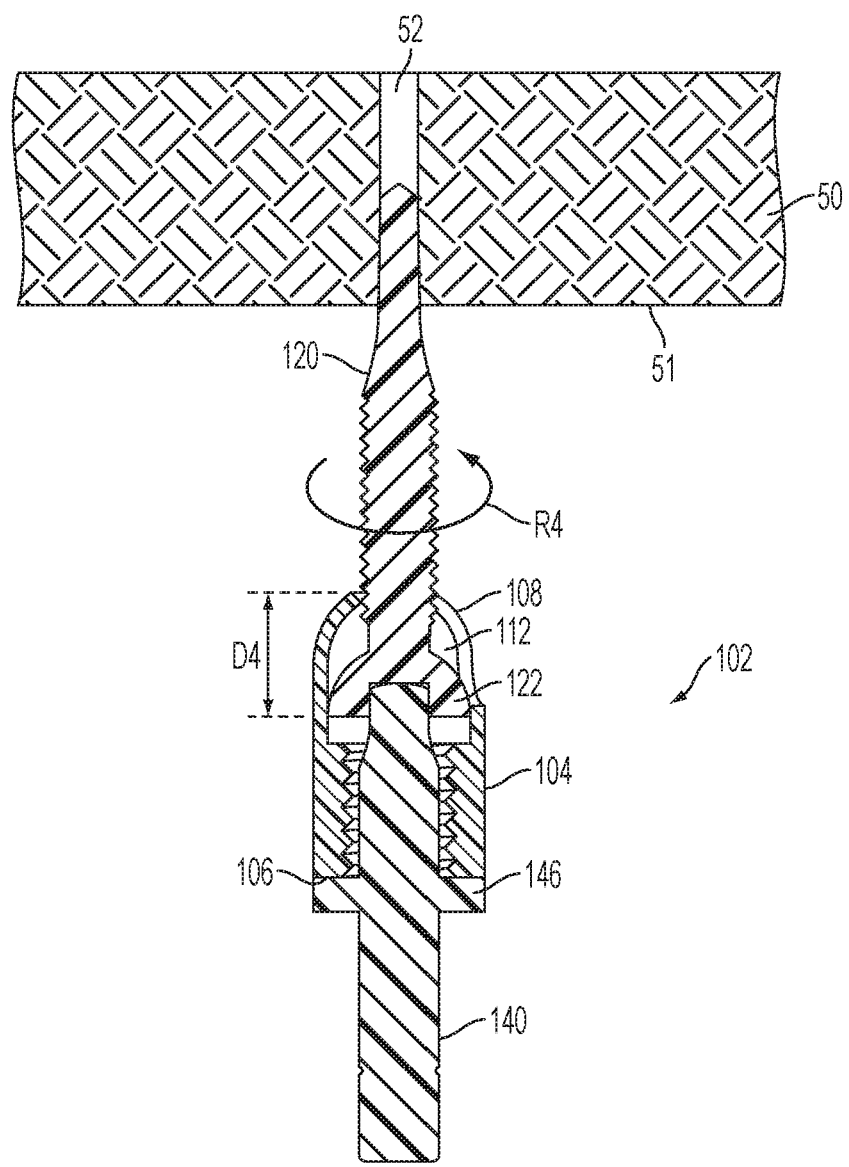
FIG. 9 is an engaged cross-sectional view of the swivel hanger system of FIG. 7 being installed within the support surface.

Installation of the system 102 is now described with reference to FIGS. 7-10. The coupling of the swivel member 104 and the anchor member 120 is achieved in a substantially similar manner as that previously described for system 2. Referring to FIGS. 7-9, the swivel member 104 and anchor member 120 are aligned such that the lower or first end 144 of tool 140 can be inserted into the opening at the upper or second end 106 of the swivel member 104 so as to engage with the indentation 123 of anchor head 122. As depicted in FIG. 9, during securing of the anchor member 120 within the support surface bore 52 (for example, by a rotating, screwing connection as indicated by rotational arrow R4), a spacing or gap distance D4 is defined between the flat upper side of the anchor head 122 and the lower or first end 108 of the swivel member 104 (when the anchor member 120 and swivel member 104 are generally aligned in the same lengthwise direction). This gap distance D4 allows for engagement of the tool first end 144 with the anchor head indentation 123 to facilitate transfer of linear and/or rotational forces from the tool 140 to the anchor member 120 (so as to insert the anchor member into the support surface bore 52). Anchor insertion is initiated by abutting the lower or first end 124 of the anchor member 120 against the surface 51 of the support member 50 (for example, a side wall or top/ceiling wall of a room). The tool 140 is rotated while force is applied to the anchor member 20 via the tool 40 (due to engagement of the tool first end 144 with the anchor head indentation 123). This causes rotation of the anchor member 120 (for example, in rotational direction R4) and movement of the anchor member into the bore 52.

Figure 10:
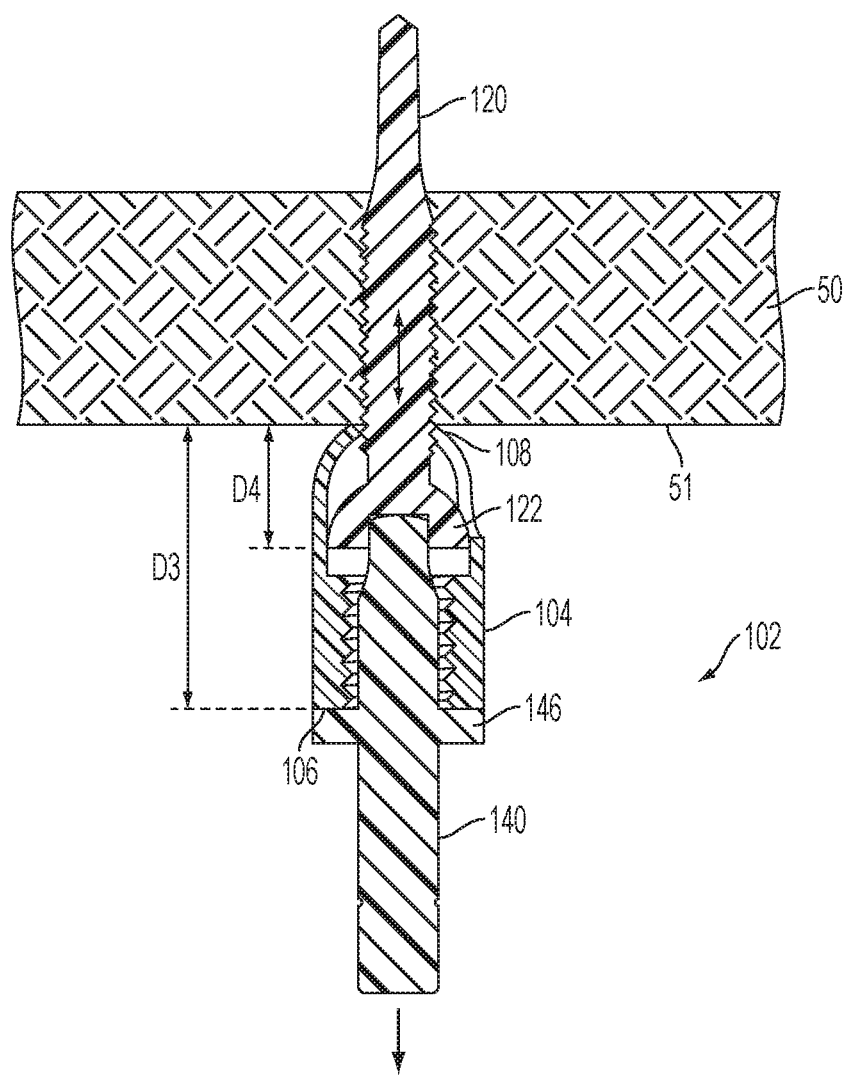
FIG. 10 is a cross-sectional view of the swivel hanger system of FIG. 7 connected with the support surface with the tool in its forward most position.

Referring to FIG. 10, the anchor member 120 has been inserted into the support surface bore 52 (via action of the tool 140) to the point where first end 108 abuts support surface 51. At this point in the insertion sequence, as discussed above, the tool 140 cannot move any further toward surface 51 due to the intervening swivel member 104. However, because tool end 144 is still located in receptacle or head indentation 123, rotation of tool 140 still advances anchor member 120 further into surface 51. This advancement via tool 140 rotation will continue until anchor member 120 moves forward (into support surface 50) enough that first end 144 is no longer engaged in head indentation 123 and can therefore no longer transfer rotational force to anchor member 120.

Figure 11:
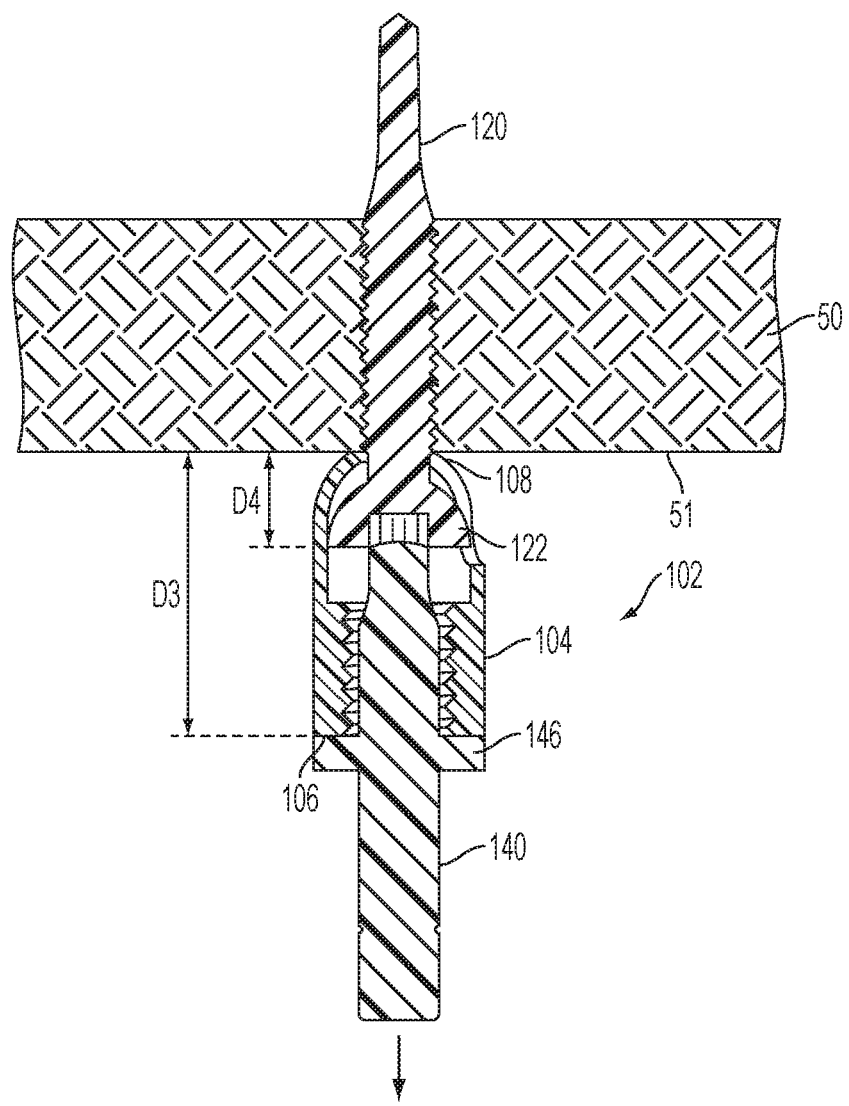
FIG. 11 is a cross-sectional view of the swivel hanger system of FIG. 7 connected with the support surface with the fastener in its forward most position.

Referring to FIG. 11, the anchor member 120 has been inserted within the support surface bore 52 (via action of the tool 140) to the furthest permissible extent (i.e., a maximum insertion distance of the anchor member has been reached) based upon the system configuration. In particular, at this final anchor member insertion state, the anchor member 120 is prevented from further movement into the bore 152 when the lower or first end 108 of the swivel member 104 engages the support surface 51. This is because the tool 140 can no longer advance toward the support surface 51 to further drive the anchor member 120 into the bore 52 due to the abutment or stop engagement between the tool member flange 146 with the upper or second end 106 of the swivel member 104 in combination with the lower or first end 108 of the swivel member 104 engaging the support surface 51. For a given fastener and tool 140 geometry, there is a distance D4 below which swivel member 104 does not have sufficient space to freely pivot about anchor head 122. Since the tool 140 cannot advance toward the support member 50 beyond the length of the swivel member 104 (indicated as distance D3 in FIG. 10), this ensures that the minimum gap distance D4 is maintained after installation so as to allow for free swivel movements of the swivel member 104 in relation to the anchor member 120 and the support member 50. In other words the present systems limits the amount anchor member 120 can be driven into a support surface to ensure that there is sufficient gap between anchor head 122 and the support surface so that end 108 of swivel member has sufficient space to swivel without obstruction. Furthermore, the present system allows for this over tightening prevention system to be achieved without a stop structure such as flange end 26 on anchor member 20.

Figure 12:
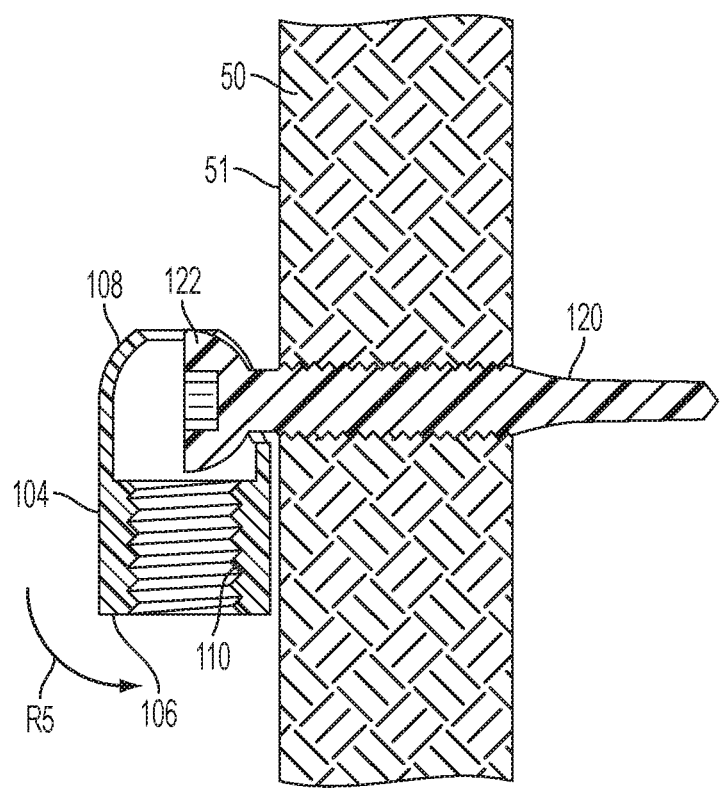
FIG. 12 is a cross-sectional view of the swivel hanger system of FIG. 7 connected with the support surface with the hanger supported at a 90° angle with respect to the surface.
Figure 13:
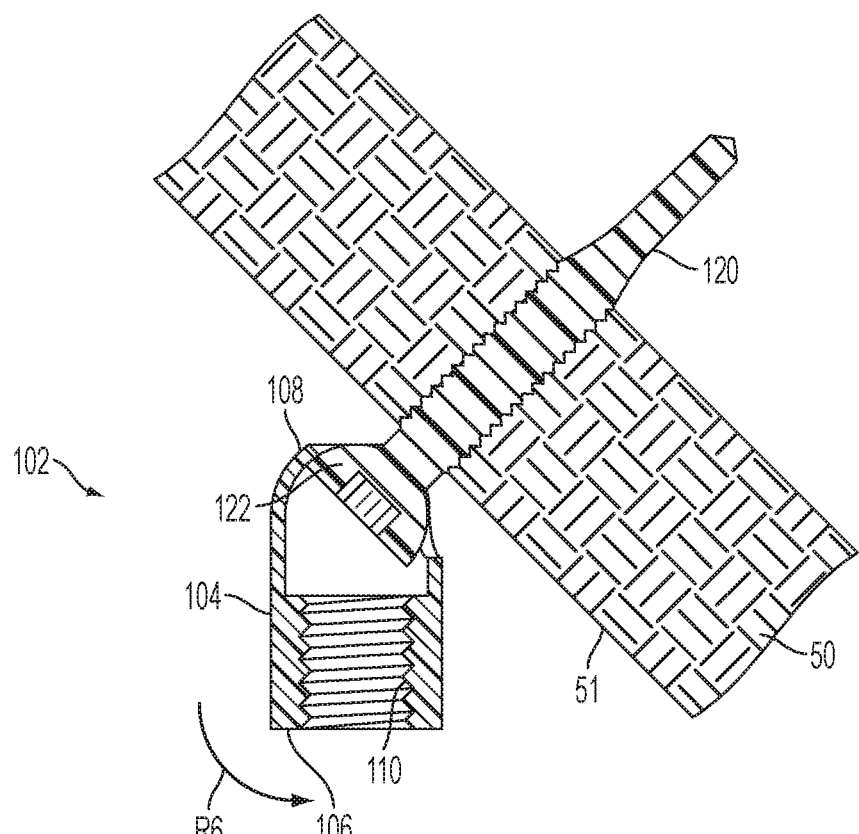
FIG. 13 is a cross-sectional view of the swivel hanger system of FIG. 7 connected with the support surface with the hanger supported at a 45° angle with respect to the surface.

As indicated in FIGS. 11-13, the swivel member 104 can rotate at a variety of different orientations in relation to the anchor member 120 and support surface 51 (as indicated by rotation arrows R5 and R6 in FIGS. 11 and 12). An object can be supported by the swivel system 102 via connection between a threaded connector of the object and the threaded interior surface 110 at the upper or second end 106 of the swivel member 104.

Thus, the swivel hanger system of the present invention facilitates an easy connection to a support member with a built-in stop mechanism that prevents securing of the anchor member too far within the support member. This in turn ensures free swivel movements (i.e., horizontal and/or vertical rotational movements) of the swivel member in relation to the anchor member and support member after installation.

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. An anchoring system including a swivel and a tool, the tool for installing the swivel into a support member for suspending an object therefrom, the system comprising:
    an anchor member and a swivel member forming the swivel;

the anchor member including a first end and a second end, an anchor head disposed at the second end of the anchor member having a patterned indentation therein to facilitate rotation of the anchor member, and an elongated body disposed between the first and second ends of the anchor member, wherein at least a portion of the elongated body is threaded, the threads of which are configured to be engageably and rotatably inserted into the support member when the swivel is connected with the support member;

the swivel member having a hollow interior and including a first end and a second end coupleable to the suspended object, the first end including a first slotted opening extending into the hollow interior through a sidewall thereof, the second end of the swivel member including a second opening extending into the hollow interior, the hollow interior at the first end forming a socket having an interior surface configured to rotatably couple with the anchor head such that the anchor head is trapped within the hollow interior and the elongated body extends through the slotted opening; and the tool including a driving end having a cross-sectional shape corresponding to the patterned indentation in the anchor head, and including a flange extending transversely therefrom;

wherein the tool is configured to extend into the swivel member hollow interior via the second end opening such to engage the driving end within the indentation of the anchor head to rotate the anchor member, and wherein the second end of the swivel member engages the flange to limit an insertion distance of the tool; and wherein the distance of the flange from the driving end of the tool is dimensioned such that, during insertion of the anchor member into the support member, when the flange engages the second end of the swivel member and the first end of the swivel member abuts the support member, the anchor head is spaced from the interior surface of the socket such to provide a gap between the anchor head and the support member which prevents obstructed movement of the swivel member and enables the swivel member to be freely suspended from a support member disposed at any angle.

2. The system of claim 1, wherein the driving end includes a patterned exterior surface that corresponds with the patterned indentation.

3. The system of claim 1, wherein the drive end is at a first end of the tool and the tool includes a second end, wherein the flange is located along a main body portion of the tool between the first and second tool ends and the flange is suitably dimensioned to abut the swivel member second end when the tool first end is inserted within the swivel member hollow interior.

4. The system of claim 3, wherein the swivel member is a one-piece swivel member.

5. The system of claim 1, wherein the socket is rounded and the anchor head has a hemispherical shape that corresponds with the rounded socket of the swivel member such that coupling the rounded socket and the anchor head facilitates swivel movements of the anchor member relative to the swivel member.

6. The system of claim 1 wherein, the hollow interior includes a threaded interior surface that extends proximate the second end opening of the swivel member so as to facilitate attachment of an object to the swivel member during system use.

7. A kit including a swivel and a tool for installing the swivel into a support member for suspending an object therefrom, the kit comprising:

an anchor member and a swivel member forming the swivel;

the anchor member including a first end and a second end, an anchor head disposed at the second end of the anchor member having an engaging structure formed therein to facilitate rotation of the anchor member, and an elongated body disposed between the first and second ends of the anchor member, wherein at least a portion of the elongated body is threaded, the threads of which are configured to be engageably and rotatably inserted into the support member when the swivel is connected with the support member;

the swivel member having a hollow interior and including a first end and a second end coupleable to the suspended object, the first end including a first slotted opening extending into the hollow interior through a sidewall thereof, the second end of the swivel member including a second opening extending to the hollow interior, the hollow interior at the first end forming a socket having an interior surface configured to rotatably couple with the anchor head such that the anchor head is trapped within the hollow interior and the elongated body extends through the slotted opening; and the tool including a first end and a second end, the first end having a cross-sectional shape corresponding to the engaging structure formed in the anchor head, and the tool also including a flange extending transversely therefrom;

wherein the tool is configured to extend into the swivel member hollow interior via the second end opening such to engage the first end within the engaging structure of the anchor head to rotate the anchor member, and wherein the second end of the swivel member engages the flange to limit an insertion distance of the tool; and wherein, the distance of the flange from the first end of the tool is dimensioned such that, during insertion of the anchor member into the support member, when the flange engages the second end of the swivel member and the first end of the swivel member abuts the support member, the anchor head is spaced from the interior surface of the socket such to provide a gap between the anchor head and the support member which prevents obstructed movement of the swivel member and enables the swivel member to be freely suspended from a support member disposed at any angle.

8. The kit of claim 7, wherein the engaging structure of the anchor head includes a patterned receptacle, and the tool first end includes a patterned exterior surface that corresponds with the patterned receptacle.

9. The kit of claim 7, wherein the flange is located along a main body portion of the tool, the flange located between the first and second tool ends and the flange being suitably dimensioned to abut the swivel member second end when the tool first end is inserted within the swivel member hollow interior.

10. The kit of claim 7, wherein the socket is rounded and the anchor head has a hemispherical shape that corresponds with the rounded socket of the swivel member such that coupling the socket and anchor head facilitates swivel movements of the anchor member relative to the swivel member.

11. The kit of claim 7 wherein, the hollow interior includes a threaded interior surface that extends proximate the second end opening of the swivel member so as to facilitate attachment of an object to the swivel member during system use.

\* \* \* \* \*